US 8,654,484 B2

(12) United States Patent
Konecny et al.

(10) Patent No.: US 8,654,484 B2
(45) Date of Patent: Feb. 18, 2014

(54) CONTINUOUS POWER PROTECTION

(75) Inventors: Pavel Konecny, San Jose, CA (US); Ali Fawaz, Dearborn, MI (US)

(73) Assignee: Silicon Laboratories Inc., Austin, TX (US)

( * ) Notice: Subject to any disclaimer, the term of this patent is extended or adjusted under 35 U.S.C. 154(b) by 345 days.

(21) Appl. No.: 12/946,985

(22) Filed: Nov. 16, 2010

(65) Prior Publication Data

US 2012/0063037 A1 Mar. 15, 2012

Related U.S. Application Data

(60) Provisional application No. 61/381,844, filed on Sep. 10, 2010.

(51) Int. Cl.
*H02H 7/00* (2006.01)
*H02H 9/00* (2006.01)
*H02H 3/20* (2006.01)
*H02H 9/04* (2006.01)

(52) U.S. Cl.
USPC .......................................... 361/18; 361/91.1

(58) Field of Classification Search
USPC ......................................................... 361/18
See application file for complete search history.

(56) References Cited

U.S. PATENT DOCUMENTS 7,054,171 B1 * 5/2006 Bailly et al. ............... 363/21.08
2010/0265742 A1 * 10/2010 Hu et al. .................... 363/21.13

OTHER PUBLICATIONS

IEC International Standard 60950-1, "Information Technology Equipment—Safety—Part 1: General Requirements," Second edition, 2005, 19 pages URL: <http://webstore.iec.ch/preview/info_iec60950-1%7Bed2.0%7Den_d.pdf>.

* cited by examiner

*Primary Examiner* — Dharti Patel
(74) *Attorney, Agent, or Firm* — Abel Law Group, LLP

(57) ABSTRACT

A power supply including a switching voltage regulator detects a peak power fault if a peak power limit is exceeded during a switching cycle of the voltage regulator. A second fault condition exists if a second power limit, lower than the peak power limit, is exceeded over a second time period, longer than the first time period. The switching voltage regulator is stopped in response to either the first or the second fault condition. Responsive to the second fault condition, the switching voltage regulator may be stopped until AC power is cycled or until a predetermined time period has elapsed.

20 Claims, 4 Drawing Sheets

CONTINUOUS POWER PROTECTION

CROSS-REFERENCE TO RELATED APPLICATION(S)

This application claims benefit under 35 U.S.C. §119(e) of U.S. Provisional Application No. 61/381,844, filed Sep. 10, 2010, entitled "Continuous Power Protection," and naming as inventors Pavel Konecny and Ali Fawaz, which application is incorporated by reference herein in its entirety.

BACKGROUND

1. Field of the Invention

The invention relates to switching voltage regulators and to detection of fault conditions associated therewith.

2. Description of the Related Art

Switching voltage regulators are used in power supplies to provide, e.g., regulated DC output voltage from an unregulated AC input. Typical consumer products involving such switching regulators include cell phone chargers, laptop or printer power supplies (so-called "bricks"), and embedded PC power supplies. One aspect of such switching regulators is that abnormal conditions in the switching regulator can arise that cause safety concerns. For example, abnormal conditions such as short circuits can lead to risk of electric shock or overheating.

In order to address safety concerns, various safety specifications such as IEC 60950-1 provide guidance related to current, voltage and power for electronics equipment. One of the safety requirements specified by IEC 60950-1 is Limited Power Source (LPS), which specifies that the maximum output power delivery should be limited to a level that is dependent on the rated output voltage. For example, a DC power source that has a 32 Volt output voltage should not deliver more than 100VA for more than 60 seconds. The table below shows limits for inherently limited power sources where $U_{CC}$ is output voltage, $I_{sc}$ is maximum output current and S (VA) is maximum output VA measured 60 seconds after application of the load according to IEC 60950-1.

| Output voltage ($U_{cc}$) | | Output current ($I_{sc}$) | Apparent Power (S) |
|---|---|---|---|
| V a.c. | V d.c. | A | VA |
| ≤20 | ≤20 | ≤8 | ≤5 × $U_{cc}$ |
| 20 < $U_{cc}$ ≤ 30 | 20 < $U_{cc}$ ≤ 30 | ≤8 | ≤100 |
| — | 30 < $U_{cc}$ ≤ 60 | ≤150/$U_{cc}$ | ≤100 |

In order to meet LPS requirements, one approach is to provide cycle-by-cycle monitoring of maximum output delivery. However, cycle-by-cycle monitoring to meet LPS requirements can result in increased cost and may be difficult to implement in certain systems.

SUMMARY

In order to provide improved monitoring of switching voltage regulators, a method is provided to operate a power supply that includes determining a first fault condition to exist if a first power limit is exceeded during a first time period, determining a second fault condition to exist if a second power limit, lower than the first power limit, is exceeded over a second time period, longer than the first time period. Operation of the power supply is stopped in response to existence of the second fault condition.

In another embodiment, a power supply is provided that includes a first fault detection circuit that includes a comparator to compare a first power level indication indicating a power level of the power supply and a first power limit threshold and to provide an indication of a first fault condition in the power supply if the power level exceeds the first power limit during a first period of time. A second fault detection circuit receives a second power level indication and a second power limit threshold, lower than the first power limit threshold, and compares the second power level indication and the second power limit threshold to provide an indication of existence of a second fault condition in the power supply if the second power level indication exceeds the second power limit threshold over a second period of time, the second period of time being longer than the first period of time. A disable circuit stops operation of the power supply responsive to the existence of the second fault condition.

In another embodiment, a power supply includes a continuous power limit fault detection circuit coupled to receive a power level indication indicating power of the power supply and coupled to receive a power limit threshold lower than a maximum power limit. The continuous power limit fault detection circuit provides an indication of a fault condition in the power supply if the power level indication exceeds the power limit threshold in a predetermined plurality of switching cycles of the power supply for a predetermined period of time. The apparatus further includes a primary inductor and a switching transistor coupled to receive current from the primary inductor and coupled at a control node to the fault detection circuit. The transistor is turned off in response to the indication of the fault condition, thereby stopping operation of the power supply.

BRIEF DESCRIPTION OF THE DRAWINGS

The present invention may be better understood, and its numerous objects, features, and advantages made apparent to those skilled in the art by referencing the accompanying drawings.

Note that the use of the same reference symbols in different drawings indicates similar or identical items.

DESCRIPTION OF THE PREFERRED EMBODIMENT(S)

Figure 1:
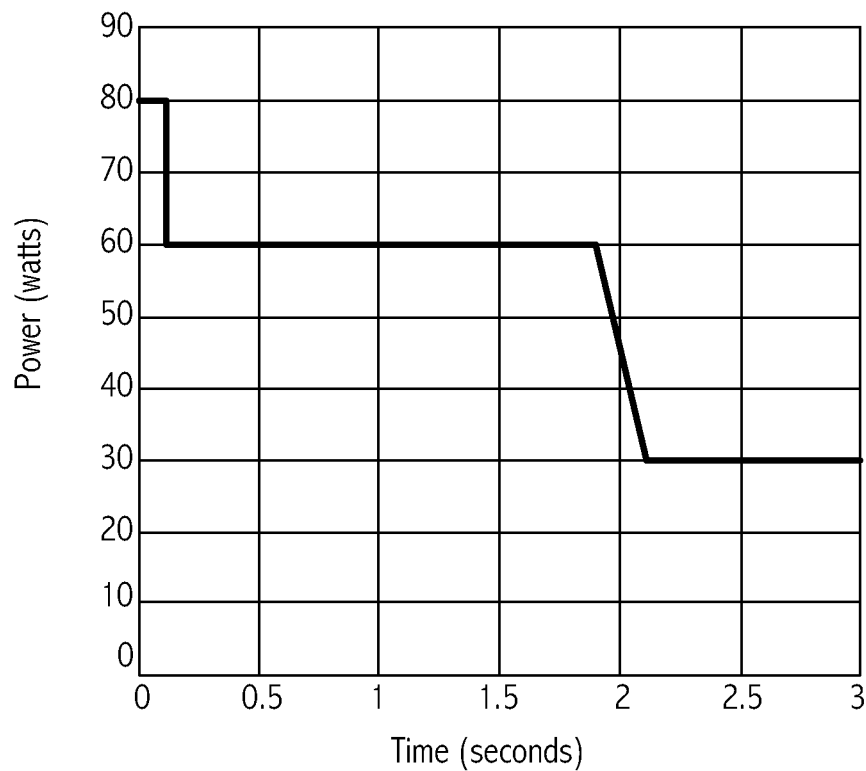
FIG. 1 illustrates an exemplary power profile of an apparatus showing maximum power allowed as a function of time.

In an exemplary system, such as an ink-jet printer or data storage device, the peak power requirements may be 70 to 80 W for a short period of time. In such systems, the peak power can be significantly higher than average output power delivered to load. Referring to FIG. 1, an exemplary power profile of an apparatus, such as a printer or storage device, shows maximum power allowed as a function of time. It can be seen in FIG. 1 that power consumed by the exemplary apparatus can be as high as 80 W for a short period of time (e.g., no more than approximately 100 ms), 60 W for no more than approximately two seconds, and 30 W for approximately one second. As can be seen from FIG. 1, the average power is significantly lower than the peak power. Note that IEC 60950-1 specifies apparent power using units VA, but Watts are used herein to refer to power. For a DC output, 1 W=1 VA.

Figure 2:
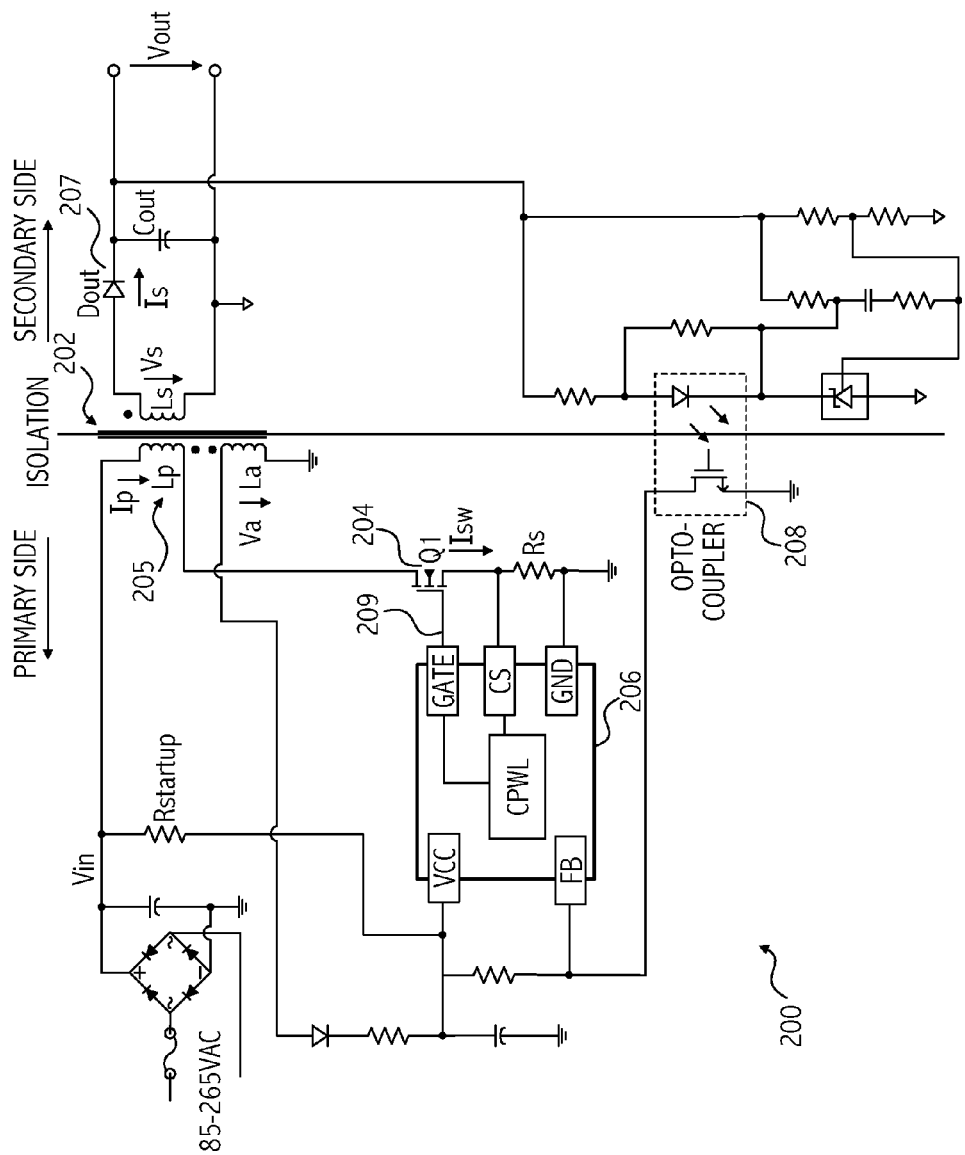
FIG. 2 illustrates a high-level block diagram of an exemplary switching voltage regulator that can be used in various embodiments of the invention.

FIG. 2 illustrates an exemplary switching regulator that may be utilized in a power supply for an apparatus having a power profile such as that shown in FIG. 1 and may be used in an embodiment of the invention. Before describing various embodiments of the continuous power limit fault detection approach, operation of an exemplary switching regulator will be explained to facilitate understanding of the invention. FIG. 2 illustrates switching regulator 200 having a topology commonly used in power supplies. The switching regulator includes high voltage isolation between the DC output (secondary side) and the AC input (primary side), which is required for safety/regulatory reasons and may also be required for functional reasons. The power is transferred from the primary side to the secondary side using a transformer 202 and primary side high voltage switch 204.

Figure 3:
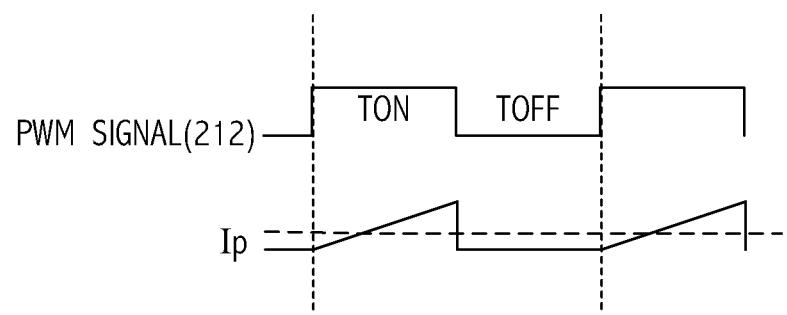
FIG. 3 illustrates waveforms associated with operation of the switching voltage regulator of FIG. 2.

The switching regulator shown in FIG. 2 operates as follows. When the power MOSFET switch 204 turns ON (TON phase) according to the gate control signal 209 supplied by the controller 206, the current Ip through primary winding 205 ramps up with a slope of Vin/Lp, and the energy stored in the transformer at the end of the TON cycle is proportional to $0.5*Lp*Ippeak^2$ where Lp is the transformer primary winding inductance and Ippeak is the primary winding peak current. FIG. 3 illustrates the relationship of TON/TOFF and the current through the primary winding. The secondary current Is is zero during the TON phase and the voltage Vs is negative referenced to the secondary side ground, Vs=−N*Vin, where N is the transformer secondary/primary turn ratio. FIG. 3 also shows that when switch 204 turns OFF (TOFF phase), the switch current Isw through transistor 204 becomes zero. At that time, the secondary current Is ramps down from the value Ispeak=Ippeak/N to zero, with a slope of approximately ~(Vout+Vdout)/Ls, where Ls is the secondary inductance.

Assume a system having a requirement to deliver minimum 80 W over all AC line conditions, temperature etc., such as the system having the power requirement shown in FIG. 1. For various embodiments, cycle-by-cycle current limit accuracy may be on the order of ±10% (without on-chip production trimming), due to comparator delay, comparator offset, current sense resistor accuracy, efficiency, etc. The ±10% accuracy in peak current translates to an approximately ±20% in output power accuracy. That means there is a need to set the cycle-by-cycle current limit to correspond to 100 W to be able to deliver 80 W. In some cases, the cycle-by-cycle limit would exceed a 100 W maximum imposed by LPS. Another disadvantage of cycle-by-cycle current limit approach to limit peak power delivery is that all power supply components need to be dimensioned to the peak power rating of the power supply in case of an over-load (load fail).

In applications where the peak power that needs to be delivered to a load for short periods of time (e.g., tens to hundreds of ms) is approaching the LPS power limit and where peak power is higher than average power delivered to load, by, e.g., 1.5 times, it is advantageous to provide a continuous power limit having a limit much lower than the peak power required for a short duration. Thus, for example, such an approach allows a short time period of high power while continuous output power that is higher than the average power rating of the supply is allowed for a longer period.

The Continuous Power Limit (CPWL) fault handling of the present invention helps to meet LPS requirements in applications with a high ratio between peak and average output power (like inkjet printers, data storage, etc.). The feature can be especially beneficial in applications where peak power to be delivered is close to the LPS power limit. It also helps to reduce the cost of external components and improves the robustness of power supply. Component lifetime is shortened and probability of component failure increases if a power supply operates at very high temperatures (and high currents/voltages) for extended periods of time. With CPWL, an overload condition would last only for several seconds. If CPWL protection does not exist and output power is limited only by cycle-by-cycle current limit, the power supply could be delivering excessive power for extended periods of time before the failing load is disconnected. CPWL fault capability facilitates delivery of peak power close to LPS power limit for a short time without the need for external components that are rated for peak power (which results in component savings). CPWL fault capability also helps meet IEC 60950-1 safety requirement without the need for a very accurate current limit. IEC 60950-1 requirement can be met even in applications required to deliver peak power over the LPS rating for a short time less than 60 seconds.

Figure 4:
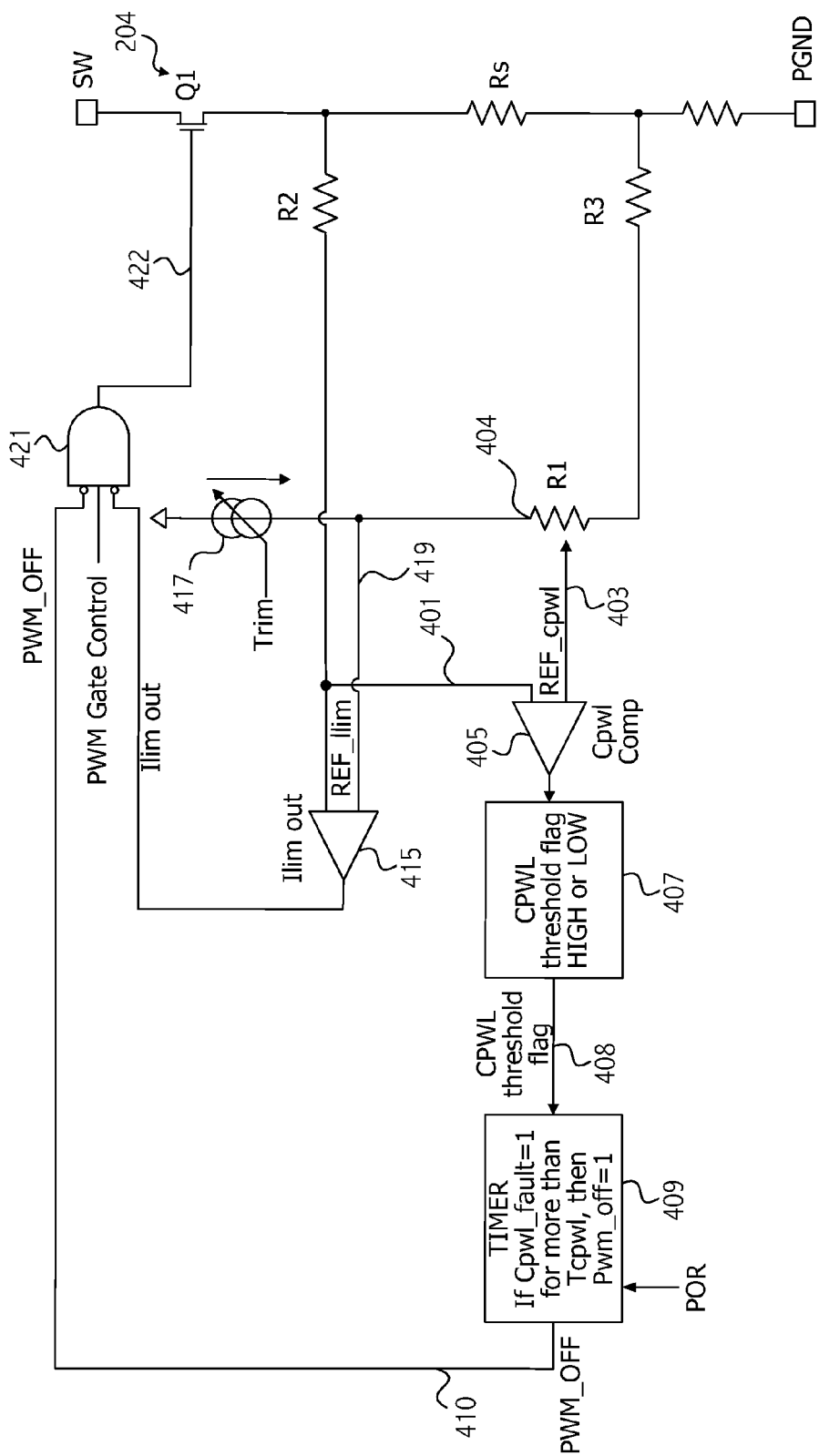
FIG. 4 illustrates an exemplary embodiment providing continuous power limit (CPWL) fault capability.

FIG. 4 illustrates an embodiment of the invention that provides both a cycle-by-cycle comparison, as well as utilizing a continuous power limit (CPWL) fault capability. The functionality of FIG. 4 may be part of the control logic 206 shown in FIG. 2. CPWL fault capability triggers a fault indication when the CPWL threshold is exceeded for a relatively long time, e.g., several seconds. That way, the power supply can still deliver peak power close to the LPS rating for a short time period, e.g., tens of milliseconds, and at the same time deliver output power which is below the CPWL threshold indefinitely.

Referring to FIG. 4, the illustrated embodiment compares a value on node 401 that corresponds to the primary side inductor peak current that flows through high voltage transistor 204 with a reference 403 in comparator 405. The reference 403 corresponds to the CPWL threshold. If that threshold is exceeded for the predetermined time, the CPWL fault is triggered. The reference 403 may be programmable by adjusting the variable resistor 404. The reference 403 may be set to correspond to a power limit threshold of, e.g., 36 W, which is higher than the rated average power, e.g. 20 W, but lower than the peak power rating, e.g., 80 W. The comparator 405 supplies the comparator indicator 406 to the CPWL fault logic 407. The CPWL fault logic 407 sets a threshold flag 408 high or low according to whether the switch current, and thus the power level, exceeds the CPWL threshold level provided by reference 403. The threshold flag 408 high indicates the CPWL threshold on reference 403 has been exceeded by the value on 401 corresponding to the primary side inductor current. The threshold flag is supplied to a timer circuit 409 that starts counting for a predetermined time period Tcpwl, e.g., 3 to 6 seconds, to determine if the CPWL threshold is exceeded for more than Tcpwl. In the exemplary system, that would mean that the CPWL threshold is exceeded in each pulse width modulation (PWM) cycle for the 3 to 6 seconds. Given the exemplary system requirements shown in FIG. 1, the 3 to 6 seconds of the timer 409 is longer than the 100 ms needed to deliver peak power and longer than the 1.8 s needed to deliver 60 W. Thus, the CPWL threshold allows both of the power requirements to be met while still detecting a continuous fault for more than 3 (or 6) seconds above the CPWL threshold. In some embodiments, the exemplary 3-6 seconds is short enough so as to not cause damage to any component. Therefore, in such a case, components can be rated to the CPWL (in this example 36W) and not the peak power limit.

In an exemplary embodiment, a rising edge of the fault flag 408 causes a counter in timer 409 to begin to count-down. If during a next PWM cycle the flag is not set because the CPWL level is not exceeded, the timer resets. In a particular embodiment, the output of the comparator 405 is examined only at the end of the TON cycle when the current through the primary inductor is at its peak (see FIG. 3). In that way, the flag 408 only changes state based on the comparator output at the end of the TON cycle.

While some embodiments may require that each of the PWM cycles have a fault flag asserted during the time period (e.g., 3 to 6 seconds), other embodiments may establish different criteria. For example, an embodiment may determine a CPWL fault to exist if a predetermined number of PWM cycles have a threshold high flag asserted within the time period Tcpwl, e.g., 3 seconds, even if the fault flag was not present in each PWM cycle. For example, the predetermined number may be a percentage, e.g., 95% of the PWM cycles, or some threshold number of cycles determined based upon the number of switching cycles that occur in the time period. Thus, timer 409 may include a timer circuit to count time and a counter to count the number of threshold high flags that occur during that time.

The embodiment shown in FIG. 4 also includes a second comparator 415 that compares the voltage corresponding to the primary side winding current on 401, to a reference 419 provided using current source 417, which reference is higher than the reference threshold supplied to comparator 405. The comparator 415 may compare the value supplied on node 401, which corresponds to the primary side winding current, to a reference that corresponds to, e.g., a power limit that is above the peak power rating of the supply but below the LPS power limit requirement. For example, if the peak power rating is 80 W, the LPS requirement may dictate a maximum 100 W power delivery for a 32V DC power supply. A peak power limit of, e.g., 100 W can be used, assuming a +/-10% accuracy in current measurement as described above to ensure delivery of 80 W. In general, the compare limit set for comparator 419 should be programmable and can be set depending on requirements of the particular application. If the comparator 415 indicates the current limit is reached, fault condition (Ilim_out) 416 is asserted. The same current source is used in the illustrated embodiment in FIG. 4 to generate the reference supplied on 403 and 419, although other embodiments may use separate current sources. Further, the higher threshold utilized in comparator 415 may also be adjustable, e.g., by adjusting the current source or through the use of a variable resistor.

In the embodiment shown in FIG. 4, timer circuit 409 supplies a CPWL fault indication (PWM_OFF) on node 410. If either PWM_OFF or Ilim_out become asserted, the PWM control signal supplied on node 422 turns off transistor 204. Thus, with current through the primary winding off, the system no longer provides voltage conversion. If the Ilim_out fault is asserted, the fault condition only lasts for the current PWM cycle and is reevaluated during the next PWM cycle. However, the CPWL fault condition can be handled in several different ways.

In one embodiment, if the CPWL fault condition is triggered (the CPWL threshold flag in existence for the predetermined time period), then the PWM switching is stopped indefinitely. Thus, for example, a PWM OFF condition is latched in a latch in timer 409, and that condition can only be reset by a power-on reset (POR). Thus, the CPWL fault can be cleared only by recycling AC power, i.e., the AC-DC power supply is unplugged and then plugged into AC mains.

Figure 5:
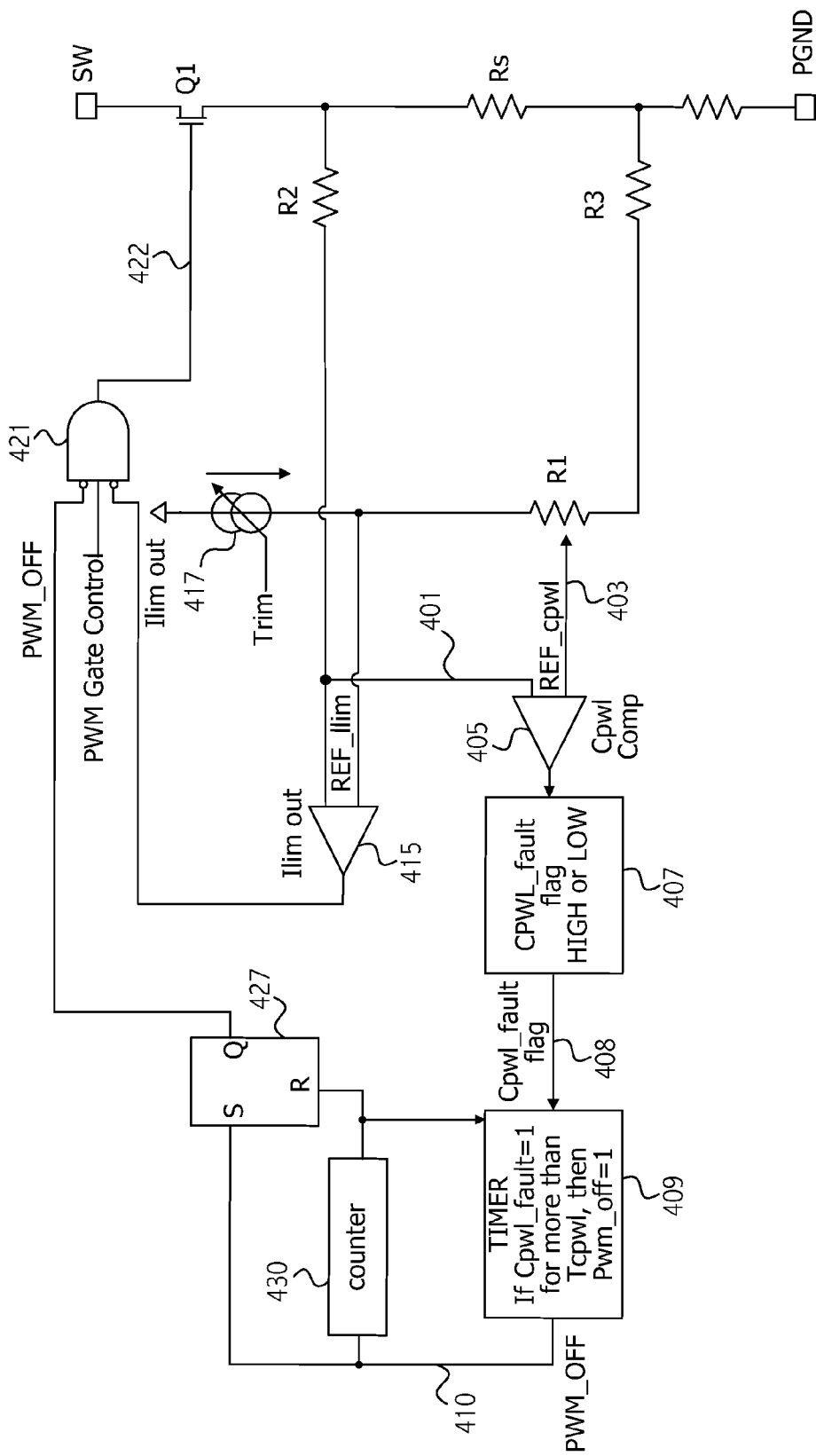
FIG. 5 illustrates an embodiment providing continuous power limit (CPWL) fault capability with an auto-restart capability.

Another embodiment shown in FIG. 5 provides an auto-restart capability. In an auto-restart embodiment, when timer block 409 determines existence of a CPWL fault, PWM switching is stopped for a predetermined period of time ($T_{PWMOFF}$). Thus, for example, in one particular implementation of such an embodiment, when timer block 409 asserts PWM_OFF, a latch 427 is set that causes AND gate 421 to disable transistor 204. At the same time, a counter 430 is started that counts a predetermined amount of time when the counter reaches a predetermined count value, clears the PWM OFF latch 427 and resets the timer block 409 (if necessary). After the predetermined time period, $T_{PWMOFF}$ expires, the PWM switching resumes and if CPWL fault condition persists for more than Tcpwl, the PWM switching stops again. The average output power in such circumstances is reduced by the Tcpwl/$T_{PWMOFF}$ ratio.

CPWL fault condition handling can be programmable, as can the $T_{PWMOFF}$ time period. Latch-off, requiring power cycling, can bring significant external components cost savings because the maximum output power is now limited by the CPWL threshold.

Note that while the embodiments shown in FIGS. 4 and 5 illustrate a comparator 415 on the primary side used to detect a fault that occurs when a power limit, higher than the CPWL limit, e.g., a peak power limit, is reached on a cycle-by-cycle basis, in other embodiments, that power limit fault may be detected on the secondary side, e.g., by examining the output current Is (see FIG. 2). Further, while cycle-by-cycle detection may be preferred in some embodiments, other embodiments may use a time period suitable for the application while still utilizing the CPWL approach described herein. Note that if peak power limit detection is implemented based on the secondary side information, fault information needs to be transmitted across the isolation between the secondary and primary sides.

The description of the invention set forth herein is illustrative, and is not intended to limit the scope of the invention as set forth in the following claims. Other variations and modifications of the embodiments disclosed herein may be made based on the description set forth herein, without departing from the scope and spirit of the invention as set forth in the following claims.

What is claimed is:

1. A method of operating a power supply comprising:
   determining a first fault condition to exist if a first power limit is exceeded during a first time period;
   determining a second fault condition to exist if a second power limit, lower than the first power limit, is exceeded over a second time period, longer than the first time period; and
   stopping operation of the power supply in response to existence of the second fault condition.

2. The method as recited in claim 1 wherein the second power limit is determined to be exceeded over the second time period if the second power limit is exceeded during a predetermined plurality of pulse width modulation (PWM) cycles of the power supply circuit occurring during the second time period.

3. The method as recited in claim 2 wherein the predetermined plurality of PWM cycles comprise each PWM cycle during the second time period.

4. The method as recited in claim 1 further comprising:
   comparing a first value corresponding to a primary side inductor peak current to a first threshold corresponding to the first power limit;
   determining the first fault condition to exist if the first value exceeds the first threshold during the first time period;

comparing a second value corresponding to the primary side inductor peak current to a second threshold corresponding to the second power limit; and determining the second fault condition to exist if the second value exceeds the second threshold the predetermined number of times over the second time period.

5. The method as recited in claim 1 further comprising determining the first fault condition to exist if a value corresponding to a primary side inductor current exceeds a first current limit threshold during a pulse width modulation (PWM) switching cycle, wherein the PWM switching cycle is the first time period.

6. The method as recited in claim 1 wherein stopping operation of the power supply comprises disabling pulse width modulation (PWM) switching of the power supply responsive to existence of either the first fault condition or the second fault condition.

7. The method as recited in claim 1 further comprising stopping operation of the power supply in response to the existence of the second fault condition until at least AC power supplied to the power supply is cycled off and on.

8. The method as recited in claim 1 further comprising stopping operation of the power supply for a predetermined period of time in response to the existence of the second fault condition and then resuming PWM switching responsive to an end of the predetermined period.

9. The method as recited in claim 8 further comprising programming the period of time for which PWM switching is stopped in response to the second fault condition.

10. A power supply comprising:
a first fault detection circuit including a comparator to compare a first power level indication indicating a power level of the power supply and a first power limit threshold and to provide an indication of a first fault condition in the power supply if the first power level indication exceeds the first power limit threshold during a first period of time;
a second fault detection circuit, coupled to receive a second power level indication and to receive a second power limit threshold, lower than the first power limit threshold, and to compare the second power level indication and the second power limit threshold to provide an indication of existence of a second fault condition in the power supply if the second power level indication exceeds the second power limit threshold over a second period of time, the second period of time being longer than the first period of time; and
a disable circuit to stop operation of the power supply responsive to the existence of the second fault condition.

11. The power supply as recited in claim 10 wherein the second power level indication is determined to exceed the second power limit threshold over the second period of time if the second power level exceeds the second power limit threshold in a predetermined plurality of switching cycles occurring over the second time period.

12. The power supply as recited in claim 11 wherein the predetermined plurality of switching cycles is each switching cycle occurring over the second time period.

13. The power supply as recited in claim 10 wherein the second fault detection circuit comprises:
a comparator to compare the second power level indication and the second power limit threshold and to assert a compare indication if the second power level indication is higher than the second power limit threshold; and
a timer circuit to receive each asserted compare indication and to determine if the compare indication is asserted during the predetermined plurality of switching cycles during the second time period.

14. The power supply as recited in claim 10 wherein the first time period is one pulse width modulation (PWM) switching cycle of the power supply.

15. The power supply as recited in claim 10 wherein the first and second power level indications are the same.

16. The power supply as recited in claim 10 wherein the disable circuit is responsive to existence of at least one of the first fault condition and the second fault condition to turn off a switching transistor selectively coupling a primary inductor to ground.

17. The power supply as recited in claim 10 wherein the disable circuit, once it has stopped operation of the power supply in response to the second fault condition, is configured to enable operation of the power supply only in response to cycling of AC power supplied to the power supply.

18. The power supply as recited in claim 10 further comprising an auto-restart circuit including a timer circuit responsive to assertion of the second fault condition to supply a disable signal to disable the power supply for a time period determined by the timer circuit and thereafter allow the power supply circuit to restart.

19. A power supply comprising:
a continuous power limit fault detection circuit coupled to receive a power level indication indicating power of the power supply and coupled to receive a power limit threshold lower than a maximum power limit, and to provide an indication of a fault condition in the power supply responsive to the power level indication exceeding the power limit threshold in a predetermined plurality of switching cycles of the power supply over a predetermined period of time;
a primary inductor; and
a transistor coupled to receive current from the primary inductor and coupled at a control node to the fault detection circuit,
wherein the transistor is turned off responsive to the indication of the fault condition so as to stop operation of the power supply.

20. The power supply as recited in claim 19 further comprising an auto-restart circuit including a timer circuit responsive to assertion of the fault condition to supply a disable signal coupled to the control node of the transistor to disable the power supply for a time period determined by the timer circuit and responsive to an end of the time period, to allow the power supply to restart operation.

* * * * *